(12) United States Patent
Obata

(10) Patent No.: US 10,642,409 B2
(45) Date of Patent: May 5, 2020

(54) ELECTRONIC INSTRUMENT CONTROLLER

(71) Applicant: YAMAHA CORPORATION, Hamamatsu-shi (JP)

(72) Inventor: Kainosuke Obata, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/926,171

(22) Filed: Mar. 20, 2018

(65) Prior Publication Data

US 2018/0275816 A1    Sep. 27, 2018

(30) Foreign Application Priority Data

Mar. 22, 2017 (JP) ................................. 2017-056275

(51) Int. Cl.
*G06F 3/041* (2006.01)
*G06F 3/0484* (2013.01)
(Continued)

(52) U.S. Cl.
CPC .......... *G06F 3/0416* (2013.01); *G06F 3/0412* (2013.01); *G06F 3/0488* (2013.01); *G06F 3/04842* (2013.01); *G10H 1/0008* (2013.01); *G10H 1/0058* (2013.01); *G10H 1/34* (2013.01); *G10H 2220/005* (2013.01)

(58) Field of Classification Search
CPC ....... G01H 2220/091; G10H 2220/096; G10H 2220/106; G10H 2220/005; G10H 1/34; G10H 1/0058; G10H 1/0008; G06F 3/0416; G06F 3/0412; G06F 3/04842; G06F 3/0488

See application file for complete search history.

(56) References Cited

U.S. PATENT DOCUMENTS

2005/0155484 A1*  7/2005  Yanase ................. G10H 1/0058
                                                84/615
2007/0017349 A1*  1/2007  Uehara ................ G10H 1/0008
                                                84/609
(Continued)

FOREIGN PATENT DOCUMENTS

JP        4422092 B2    2/2010

*Primary Examiner* — Kent W Chang
*Assistant Examiner* — Sujit Shah
(74) *Attorney, Agent, or Firm* — Rossi, Kimms & McDowell LLP

(57) ABSTRACT

An electronic instrument controller is provided. The device includes: a display screen having a touch panel type of input device; a means configured to establish a connection with an electronic instrument; a means configured to, according to an input operation performed on the display screen, select an operator from an operator group image that is displayed on the display screen as a mockup of an operator group of the electronic instrument; a means configured to, according to an input operation performed on the display screen, switch a selection reception unit from the operator group image to an operator of the electronic instrument; a means configured to receive an operation signal from the electronic instrument; and a means configured to, upon reception of the operation signal, display an indication that an operator from the operator group image corresponding to an operated operator of the electronic instrument is selected.

12 Claims, 4 Drawing Sheets

(51) Int. Cl.
*G06F 3/0488* (2013.01)
*G10H 1/34* (2006.01)
*G10H 1/00* (2006.01)

(56) References Cited

U.S. PATENT DOCUMENTS

| | | | | |
|---|---|---|---|---|
| 2007/0017350 A1* | 1/2007 | Uehara | ................ | G10H 1/0058 84/609 |
| 2008/0208740 A1* | 8/2008 | Uehara | ................ | G06Q 20/102 705/40 |
| 2014/0208922 A1* | 7/2014 | Adnitt | .................... | G06F 3/048 84/609 |
| 2016/0042727 A1* | 2/2016 | Lim | .................... | G10H 1/0058 84/645 |

\* cited by examiner

ELECTRONIC INSTRUMENT CONTROLLER

CROSS REFERENCE TO RELATED APPLICATIONS

This application claims a priority to Japanese Patent Application No. 2017-056275 filed on Mar. 22, 2017, which is hereby incorporated by reference in its entirety.

FIELD OF INVENTION

The present invention relates to an electronic instrument controller, and a system, a program product and a method for electronic instrument control.

BACKGROUND

Conventionally, there is a portable information terminal that can switch between touch input performed on a display device and button input that is different from the touch input performed on the display device. One example is the "portable information terminal and display control method" disclosed in JP 4422092B (hereinafter, called Document 1). According to Document 1, a screen control means of the portable information terminal determines whether or not a touch input mode is set for a designated input item in an input screen, and if the determination result is that the touch input mode is set, the screen is switched from the input screen to a ten-key screen or a character key screen. If the touch input mode is not set, the mode is switched to the button input mode. After the switch to the button input mode, input operations are performed using operation buttons.

In Document 1, when an input item is selected in a touch screen such as the input screen, the screen is automatically switched to a ten-key screen or a character key screen that corresponds to the selected item. Accordingly, a separate button operation is not necessary for screen switching.

SUMMARY OF INVENTION

However, Document 1 is not directed to a terminal for the purpose of controlling an electronic instrument. The inventor of the present invention conceived that in a portable information terminal for the purpose of controlling a keyboard instrument or the like, in the case of adjusting parameters for individual keys of the keyboard instrument for example, it would be useful if the selection of a target key can be switched between selection on the terminal and selection by pressing a key of the keyboard instrument.

An object of the present invention is to provide an electronic instrument controller, and a system, a program product and a method for electric instrument control that enable the selection of an operator of the electronic instrument that is to be a target of parameter adjustment to be switched between selection on the electronic instrument controller and selection on the electronic instrument.

An electronic instrument controller is provided. This electronic instrument controller includes: a display screen having a touch panel type of input device; a connection establishing means configured to perform authentication on an electronic instrument and establish a connection with the authenticated electronic instrument; an operator selection means configured to, in accordance with a first input operation performed on the display screen, select an operator from an operator group image that is displayed on the display screen and is a mockup of an operator group of the authenticated electronic instrument; a switching means configured to, in accordance with a second input operation performed on the display screen, switch a selection reception unit from the operator group image to an operator of the authenticated electronic instrument, the selection reception unit configured to receive selection of the operator; a reception means configured to receive an operation signal that is output from the authenticated electronic instrument; and a display control means configured to, in accordance with reception of the operation signal, display an indication that an operator from the operator group image that corresponds to an operated operator of the authenticated electronic instrument is selected.

The electronic instrument may be a keyboard instrument, and the operator may be a key.

The second input operation may be a long-press of a display region of the operator group image.

An electronic instrument control system includes the above-described electronic instrument controller and the electronic instrument that has a plurality of operators included in the operator group.

A non-transitory computer-readable medium recording an electronic instrument control program is provided. This electronic instrument control program is for causing an electronic instrument controller to execute: performing authentication on an electronic instrument and establishing a connection between the electronic instrument controller and the authenticated electronic instrument; in accordance with a first input operation performed on a display screen, selecting an operator from an operator group image that is displayed on the display screen and is a mockup of an operator group of the authenticated electronic instrument; in accordance with a second input operation performed on the display screen, switching a selection reception unit from the operator group image to an operator of the authenticated electronic instrument, the selection reception unit configured to receive selection of the operator; receiving an operation signal that is output from the authenticated electronic instrument; and displaying, in accordance with reception of the operation signal, an indication that an operator from the operator group image that corresponds to an operated operator of the authenticated electronic instrument is selected.

A computer-implemented control method for an electronic instrument is provided. This electronic instrument control method includes: performing authentication on the electronic instrument and establishing a connection between an electronic instrument controller and the authenticated electronic instrument; selecting, in accordance with a first input operation performed on a display screen, an operator from an operator group image that is displayed on the display screen and is a mockup of an operator group of the authenticated electronic instrument; switching, in accordance with a second input operation performed on the display screen, a selection reception unit from the operator group image to an operator of the authenticated electronic instrument, the selection reception unit configured to receive selection of the operator; receiving an operation signal that is output from the authenticated electronic instrument; and displaying, in accordance with reception of the operation signal, an indication that an operator from the operator group image that corresponds to an operated operator of the authenticated electronic instrument is selected.

DETAILED DESCRIPTION OF THE PREFERRED EMBODIMENTS

Hereinafter, examples of an electronic instrument controller, and a system, a program product and a method for electronic instrument control will be described as an embodiment of the present invention. In the following description, a "keyboard instrument" is described as an example of an electronic instrument, a keyboard is described as an example of an operator group, a key is described as an example of an operator, and a keyboard image is described as an example of an operator group image.

Figure 1:
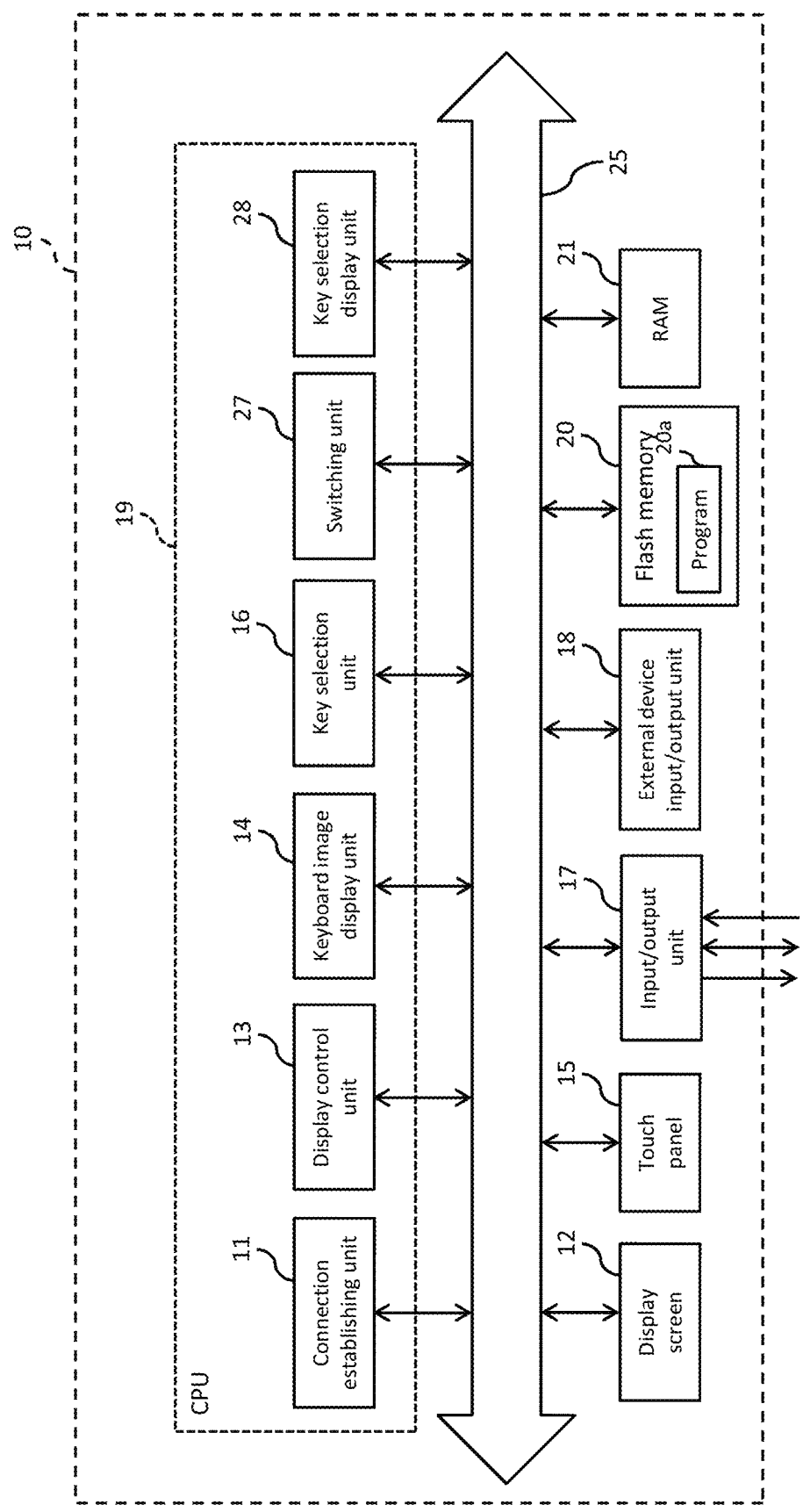
FIG. 1 is a block diagram showing a main electrical configuration of an electronic instrument control device (controller) according to an embodiment of the present invention.

FIG. 1 shows the main electrical configuration of an electronic instrument control terminal (device) 10 of the present embodiment. The electronic instrument control terminal 10 includes a connection establishing unit 11, a display screen 12, a display control unit 13, a unit 14 that displays a keyboard image 40 (see FIG. 3) on the display screen 12 (hereinafter, called a "keyboard image display unit"), a touch panel 15, a key selection unit 16, an input/output unit 17, an external device input/output unit 18, a flash memory 20, a RAM 21, a switching unit 27, and a unit 28 that indicates that a key (operator) is selected (hereinafter, called a "key selection display unit"), and these constituent elements are electrically connected by a system bus 25. Note that the electronic instrument control terminal 10 includes a CPU 19, and, by executing a program (computer program) 20a stored in the flash memory 20, the CPU 19 virtually operates as the connection establishing unit 11, the display control unit 13, the keyboard image display unit 14, the key selection unit 16, the switching unit 27, and the key selection display unit 28.

Also, a detection circuit (not shown) that is connected to the touch panel 15 and a display circuit (not shown) that is connected to the display screen 12 are provided. By executing the program 20a stored in the flash memory 20, the CPU 19 controls the detection of operations on the touch panel 15 by the detection circuit, the display of screens on the display screen 12 by the display circuit, the reception of an identification number (ID) and the output of adjustment parameters by the input/output unit 17, the adjustment of parameters performed through operations performed on the touch panel 15, signal processing, and the like.

The connection establishing unit 11 can perform authentication on a keyboard instrument and establish a connection with an authenticated keyboard instrument 30, thus enabling communication to be performed between the electronic instrument control terminal 10 and the authenticated keyboard instrument 30. Specifically, as will be described later, an identification number is input through an operation performed on the touch panel 15, and an identification number output from the keyboard instrument 30 is also received from the input/output unit 17. Then, with use of a determination unit (not shown) that is realized by executing the program 20a, the CPU 19 authenticates the keyboard instrument if it is determined that the two identification numbers match each other.

First, authentication will be described briefly. There are cases where multiple electronic instrument control terminals 10 and multiple keyboard instruments can exist in the same operation space. A user performs authentication establishment processing for specifying a keyboard instrument that is to be communicable with the electronic instrument control terminal 10, sets that keyboard instrument 30 as the connection target device, and enables communication between the electronic instrument control terminal 10 and the authenticated keyboard instrument 30. In other words, in the present embodiment, when a keyboard instrument is authenticated by the connection establishing unit 11 of the electronic instrument control terminal 10, the electronic instrument control terminal 10 and the authenticated keyboard instrument 30 establish a connection and can communicate with each other.

The display screen 12 is a liquid crystal display device with a touch panel type of input device. The display screen 12 can display a graphical user interface (GUI). This graphical user interface is for performing the adjustment of parameter values, for example. The display screen 12 receives display data that expresses content that is to be displayed, and displays images such as parameter change amounts 56 based on the display data. The display circuit is a circuit for controlling the display content based on instructions from the CPU 19.

The display control unit 13 displays, on the display screen 12, which is a liquid crystal panel (LCD) or the like, various images such as a parameter background image 50 and parameter change amounts 56 from an initial parameter value 51 of an adjustment parameter that are adjusted for respective keys 31 of the keyboard instrument 30. The keyboard image display unit 14 displays, on the display screen 12, a keyboard image 40 that is a mockup of the keyboard (operator group) of the keyboard instrument 30. In accordance with the input/output unit receiving a key press signal transmitted from the keyboard instrument 30, the display control unit 13 may indicate that the key from the keyboard image 40 that corresponds to the pressed key 31 is selected.

The touch panel 15 is an electrostatic capacitive touch panel, and is affixed to the upper surface of the display screen 12. The touch panel 15 includes a protection film (not shown) that has an operation surface on the upper surface, and an electrode (not shown) that is arranged in a layer below the protection film, and detects touches.

The adjustment of parameters such as pitch and volume for individual keys 31 is performed by performing operations (operations on a plus button 53 or minus button 54, operations on a slider 52, etc.) on the touch panel 15, for example. Here, pitch indicates the sound pitch and is determined by the frequency. Accordingly, the adjustment of the pitch of the keys 31 is performed with use of the frequency as the parameter.

The input/output unit 17 is a communication interface for performing data input and output with the keyboard instrument 30. The input/output unit 17 outputs adjustment parameters for the keys 31 (e.g., specific adjustment values) and the like to the keyboard instrument 30. The input/output unit 17 also receives an identification number from the keyboard instrument 30.

The external device input/output unit 18 is a communication interface for performing data input and output with an external device (not shown) such as another display device, a pointing device such as a mouse, a keyboard for character input, an operation panel, another music device, a personal computer, or a speaker.

The CPU 19 controls the electronic instrument control terminal 10. The CPU 19 is a control unit that controls parameter operations, and, by executing the program 20*a* stored in the flash memory 20, performs processing such as parameter setting processing.

The flash memory 20 is a rewritable non-volatile storage device that stores various types of programs such as the program 20*a* that is executed by the CPU 19, and the CPU 19 reads out the program 20*a* from the flash memory 20 and executes it as necessary. In addition to various types of programs 20*a*, the flash memory 20 also stores various types of data such as initial parameter values 51, as well as graphic data such as various images and character data that are to be displayed on the display screen 12.

The RAM 21 temporarily stores processing results and arithmetic operation results obtained by the CPU 19, and also functions as a work memory when the CPU 19 executes the program 20*a*.

The switching unit 27 switches the key selector (the selection reception unit that receives the selection of a key) from the keyboard image 40 to the keys 31 of the keyboard instrument 30 in accordance with a second input operation performed on the display screen 12. In other words, the selection of a key 31 to be a target of parameter adjustment is switched from a state where the electronic instrument control terminal 10 is used to a state where the keyboard instrument 30 is used. For example, the selection of the key 31 that is to be a parameter adjustment target is switched from an operation mode in which selection is performed on the keyboard image 40, a key display portion 41, a display bar 55 or the like that are displayed on the display screen 12 of the electronic instrument control terminal 10, to an operation mode in which selection is performed by pressing (operating) the key (operator) 31 of the keyboard instrument 30.

In the present embodiment, the operation mode can be switched by long-pressing a specific region such as a keyboard image display region 70 on the display screen 12. Accordingly, for example, if the operation mode is switched by long-pressing the specific region (e.g., the keyboard image display region 70), the operation mode is switched from the operation mode using the electronic instrument control terminal 10, in which selection is performed by touching a key in the keyboard image 40 on the display screen 12, to an operation mode in which selection is performed by pressing a key of the keyboard instrument, which enables key selection by pressing a key of the keyboard instrument.

If the operation mode is switched from the operation mode in which a key is selected in the keyboard image 40 on the display screen 12 to the operation mode of performing selection by pressing a key of the keyboard instrument 30, a popup message showing "Select a key by pressing a key of the instrument" or the like is displayed on the display screen 12, and a key 31 that is to be the parameter adjustment target can be selected by pressing a key 31 of the keyboard instrument 30.

The key selection unit 16 selects a key from the keyboard image 40 on the display screen 12 that is a mockup of the keyboard of the keyboard instrument 30, in accordance with a first input operation performed on the display screen 12. In other words, a key is selected on the display screen 12 of the electronic instrument control terminal 10. Specifically, the user selects a key 31 of the keyboard instrument 30 whose parameter is to be adjusted by, for example, touching the corresponding key in the keyboard image 40. The key may be selected by an operation other than touching a key in the keyboard image 40, such as an operation performed on the key display portion 41, the display bar 55, or the like. This selection made by the key selection unit 16 is performed based on the detection of a touch on the touch panel 15, such as a touch on a key of the keyboard image 40 or a slide operation performed on a certain display bar 55 in the keyboard image 40.

In the operation mode in which a key 31 is selected by pressing a key of the keyboard instrument 30, the input/output unit 17 receives an operation signal (key press signal) that is output (transmitted) from the keyboard instrument 30. When this key press signal is received, an indication of the selection of the key in the keyboard image 40 that corresponds to the pressed key 31 is displayed on the display screen 12.

As described above, when a key 31 of the keyboard instrument 30 is pressed, a key press signal is output from the key 31, and when that key press signal transmitted from the keyboard instrument 30 is received, the key selection display unit 28 displays an indication that the key in the keyboard image 40 that corresponds to the pressed key 31 is selected. According to this key selection display unit 28, a key is displayed in the key display portion 41, and a display bar 55 is displayed on the key in the keyboard image 40.

Figure 2:
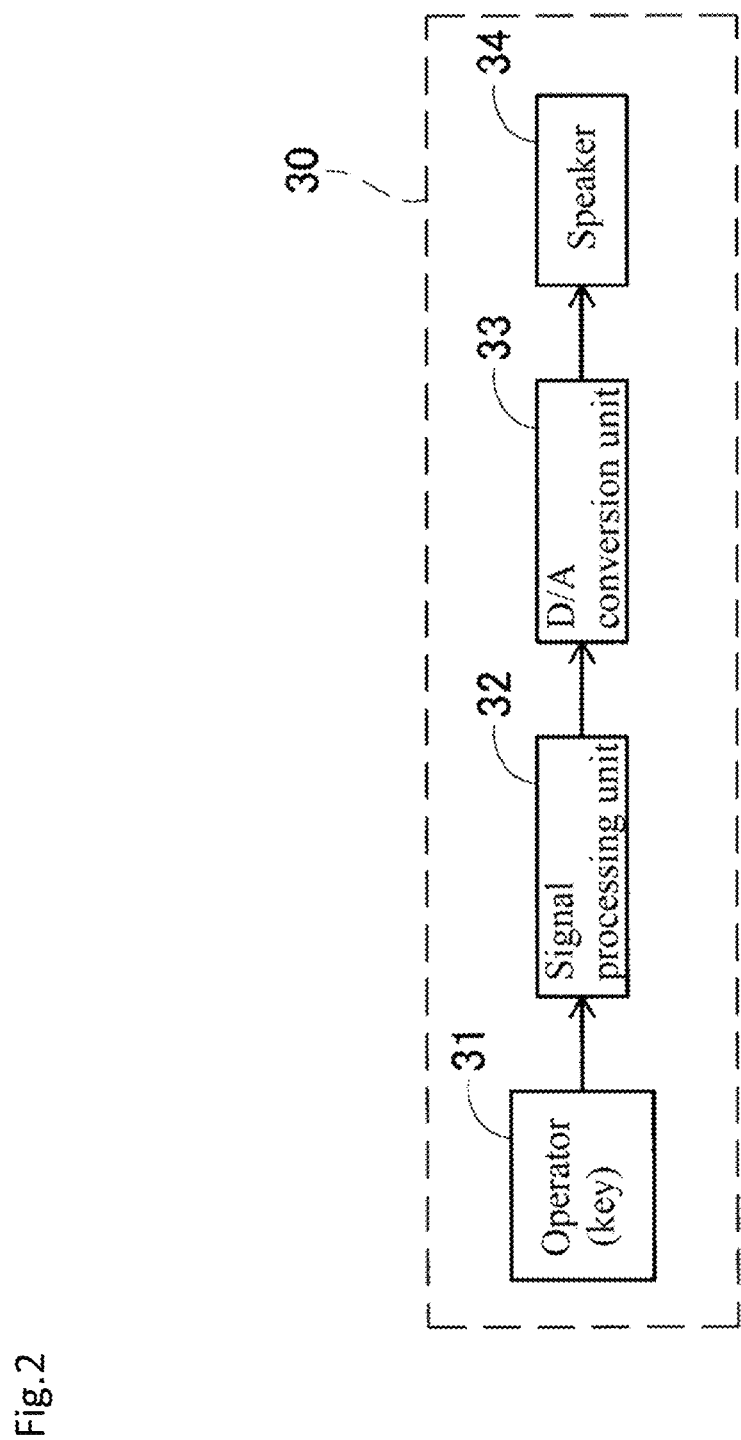
FIG. 2 is a block diagram showing a main electrical configuration of an electronic instrument according to the embodiment of the present invention.

FIG. 2 shows the main electrical configuration of the keyboard instrument 30 of the present embodiment. The keyboard instrument 30 has substantially the same configuration as a conventional keyboard instrument. Specifically, as shown in FIG. 2, it includes keys 31, a signal processing unit 32, a D/A conversion unit 33, a speaker 34, and the like, and is configured so as to generate a signal in accordance with operations performed on the keys 31 by a user, and emit music from the speaker 34 based on the signal. As previously described, a connection with the electronic instrument control terminal 10 is established when authenticated in the electronic instrument control terminal 10.

The keyboard includes the keys 31 that include an array of white keys and black keys, and outputs a signal corresponding to operations performed on the keys 31 to the signal processing unit 32. This signal includes information indicating the position of a pressed key 31 (key number), information indicating that a key is pressed (key on), information indicating that a key is released (key off), a key pressing speed (velocity), and the like. Specifically, when a key is pressed, "key on", "velocity", and "key number" are output in association with each other, and when the key is released, "key off" is output.

The signal processing unit 32 includes a sound source that is compliant with the MIDI (registered trademark) standard or the like, and functions as an audio signal generation unit that generates an audio signal, which is digital data, by performing real-time waveform synthesizing based on the aforementioned signal that is output in accordance with an operation performed on a key 31 by a user. Specifically, when the user starts a performance by operating a key 31 of the keyboard instrument 30, the signal processing unit 32 generates an audio signal in accordance with the operation of the key 31.

When the user operates a key 31 of the keyboard of the keyboard instrument 30, sound is emitted from the speaker 34. The type of sound (pitch, volume, etc.) that is emitted can be changed with use of a touch button (not shown), a slider (not shown), or the like of the keyboard instrument 30.

The D/A conversion unit 33 converts the audio signal generated by the signal processing unit 32 into an analog signal and drives the speaker 34. Accordingly, music that corresponds to operations performed on the keys 31 by the user is emitted from the speaker 34.

The keyboard instrument 30 has an input/output unit (not shown) for performing a function for exchanging information with the electronic instrument control terminal 10 and performing various types of setting. Specifically, the input/output unit is a communication interface for exchanging data with the electronic instrument control terminal 10 and receiving the input of an adjustment parameter signal that indicates a parameter adjusted in the electronic instrument control terminal 10.

The electronic instrument control terminal 10 and the keyboard instrument 30 can access each other via the input/output units that are respectively provided therein, and various settings of the keyboard instrument 30 can be set from the electronic instrument control terminal 10.

In the present embodiment, the electronic instrument control terminal 10 is connected to the keyboard instrument 30 via wired communication that employs a wired cable, or via short-range wireless communication not involving a network, but the connection may be made by communication performed via a network. A communication technique employing Wi-Fi (registered trademark), Bluetooth (registered trademark), infrared communication, or the like can be used as the short-range wireless communication. Various types of cables such as a USB cable can be used as the wired cable.

Next, an example of an operation screen of the electronic instrument control terminal 10 for adjusting parameters (pitch, volume, etc.) of the keys of the keyboard instrument 30 will be described with reference to FIG. 3.

When an "Each Key Setting" button 60 is touched in the menu display in the display screen 12 of the electronic instrument control terminal 10, an "Each Key Setting" screen is displayed, and a message indicating "Tuning and volume adjustment can be performed for each keyboard. Standard tuning is applied in the initial state." is displayed. The user can adjust parameters for each key in this "Each Key Setting" screen.

More specifically, the parameters of each key 31 can be adjusted by touching tune and volume switch buttons in this screen to switch them. Specifically, upon touching a "Tune" button 58, pitch adjustment can be performed, and upon touching a "Volume" button 59, volume adjustment can be performed. Images included in the "Each Key Setting" screen will be described below.

The display screen 12 includes the keyboard image 40 that is a mockup of the keyboard of the keyboard instrument 30, and the parameter background image 50 that displays parameter change amounts 56. This parameter background image 50 is a group of strip-shaped background images and can display a bar graph that represents the parameter change amounts 56 of the keys 31. The strip-shaped background images are arranged in correspondence with the keys of the keyboard image 40, and therefore the parameter change amounts 56 are displayed in correspondence with the keys 31 in the display screen 12. When various parameters are adjusted, the parameter change amounts 56 are displayed in the form of a bar graph on the strip-shaped background images that make up the parameter background image 50. Also, the bar graph that represents the parameter change amounts 56 can be made more easily viewable by giving it a different color tone from the strip-shaped background images. Note that the region of the keyboard image 40 and/or the parameter background image 50 is considered to be the keyboard image display region 70.

A centerline that extends in the horizontal direction is displayed in the approximate center of the parameter background image 50, and, using this centerline as a reference point, parameters can be adjusted up or down from a reference value that corresponds to the reference point. The reference value is an initial parameter value 51. The adjusted adjustment parameter can also be represented as a specific numerical value on the display screen 12. The initial parameter value 51 is a value that is stored as an initial value in the program (electronic instrument control program) 20a of the electronic instrument control terminal 10, for example.

The key display portion 41 as well as a plus button 42 and a minus button 43 on the left and right of the key display portion 41 are displayed below the keyboard image 40.

Figure 3:
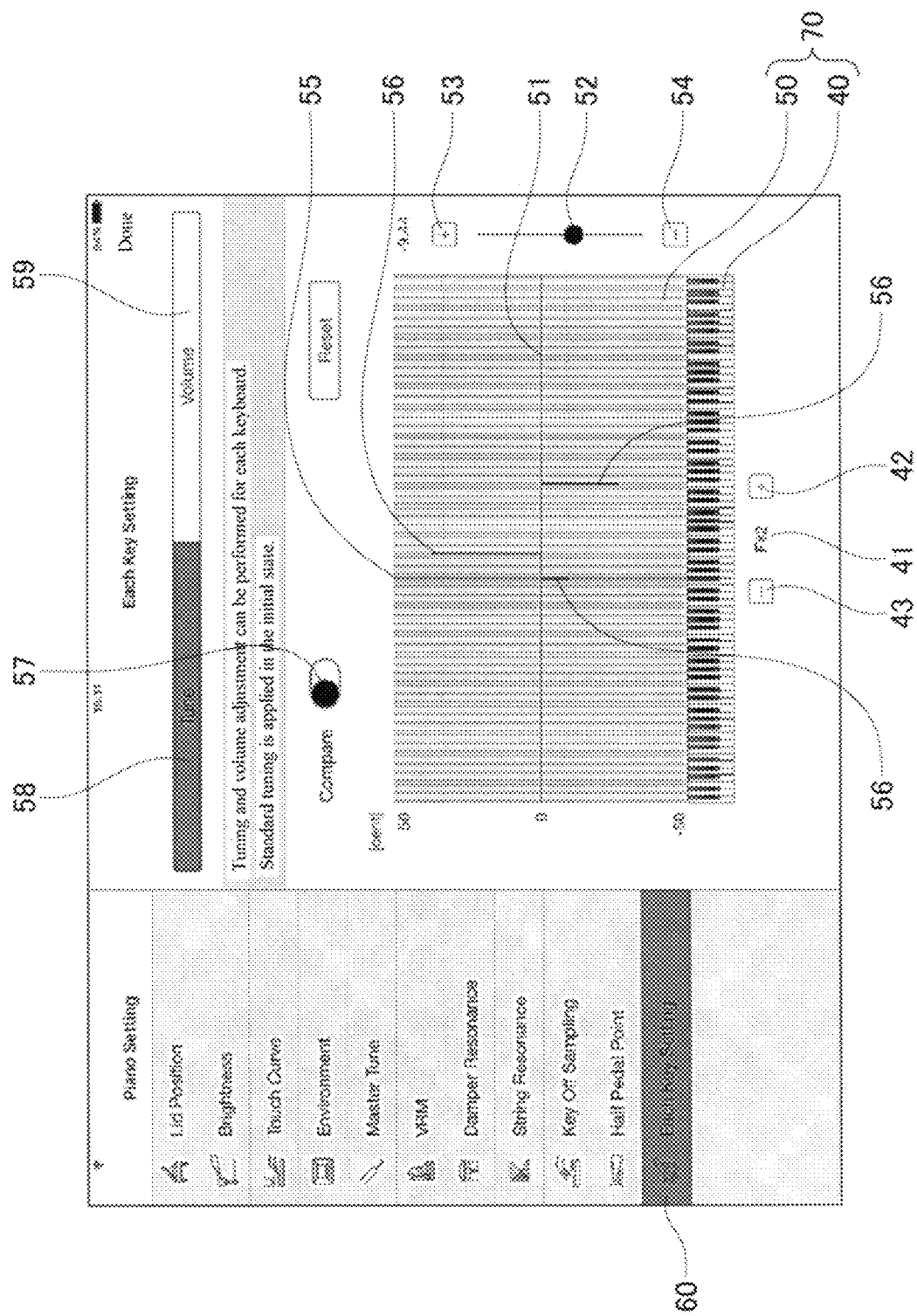
FIG. 3 is a diagram showing an operation screen of the electronic instrument control terminal according to the embodiment of the present invention.

The key that is to be the target of pitch or volume adjustment is displayed by characters in the key display portion 41 (in FIG. 3, F#2). Specifically, the key displayed in the key display portion 41 is the key 31 that is to be the target of pitch or volume adjustment, and the key 31 that is to be the adjustment target can be changed by touching the plus button 42 or the minus button 43 on the right and left sides of the key display portion 41.

Also, the display bar 55 is displayed over the key of the keyboard image 40 that is the adjustment target and on the strip-shaped background images that make up the parameter background image 50. Key selection can also be performed by sliding this display bar 55. If the key is changed by touching the plus button 42 or the minus button 43, the display bar 55 also moves to the target key of the keyboard image 40. In this way, the display bar 55 displays the selected key or the like, and specifically is displayed on a straight line on the parameter background image 50 that is displayed in correspondence with the keys of the keyboard image 40 (which also includes a bar graph image indicating the parameter change amount 56 if the parameter has been adjusted). The display bar 55 can be made more easily viewable by setting different color tones for the key of the keyboard image 40 and the strip-shaped background images that make up the parameter background image 50.

Here, the parameter background image 50 is provided with images that respectively correspond to the keys 31 (typically 88 keys). Key numbers Kn (Kn1 to Kn88) are assigned to the 88 keys 31 provided in the keyboard instrument 30 in order to identify the individual keys 31, and in the present embodiment, the key numbers Kn are assigned in ascending order from the bass side. Specifically, in a view facing the piano keyboard, the key numbers Kn are assigned in the order of Kn1, Kn2, Kn3 . . . Kn88 beginning at the key 31 on the left side (bass key) and moving rightward. The images in the parameter background image 50 are provided so as to correspond to the key numbers of the keys 31.

A slider 52 as well as a plus button 53 and a minus button 54 above and below the slider 52 are displayed to the side of the keyboard image display region 70. The parameters of a key 31 can be adjusted by touching the slider 52 or the plus button 53 and minus button 54 above and below the slider 52.

Compare button 57 is displayed above the keyboard image display region 70. This Compare button 57 returns the adjusted parameter to the initial parameter value 51.

Figure 4:
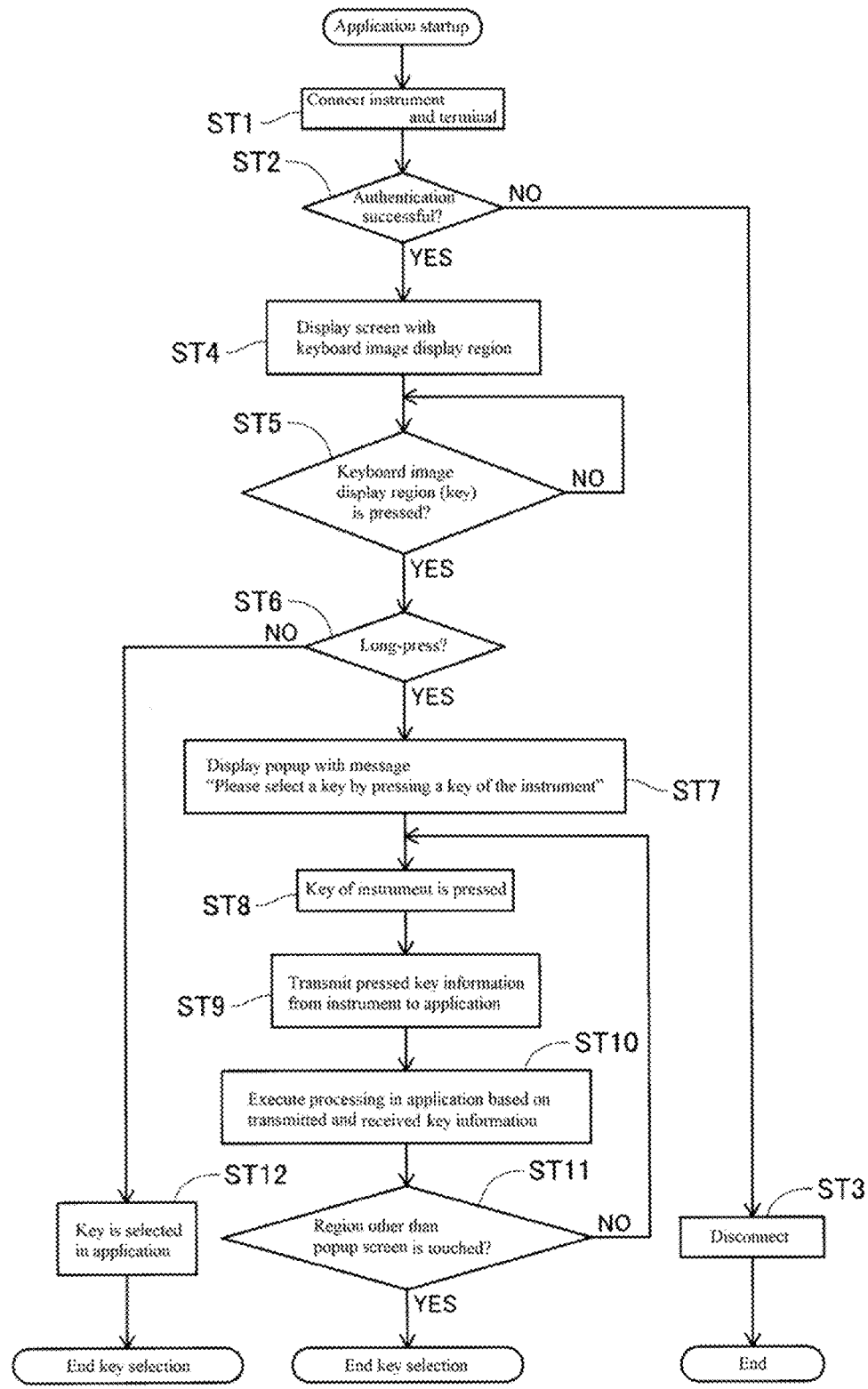
FIG. 4 is a flowchart showing a configuration of a system according to the embodiment of the present invention.

The following describes an example of a method of usage with reference to the flowchart of FIG. 4 that shows the configuration of a system according to the present embodiment.

First, the program 20a of the electronic instrument control terminal 10 is started.

Next, a keyboard instrument and the electronic instrument control terminal 10 are connected (step ST1), and thereafter authentication of the keyboard instrument 30 is performed in the electronic instrument control terminal 10 (step ST2).

The following describes an example of the authentication of step ST2. First, an identification number given to the keyboard instrument 30 is stored in the flash memory 20 of the electronic instrument control terminal 10. The identification number is an instrument identification number (a number identifying the type of instrument), an individual identification number (a serial number) or the like. The identification number is held and recorded in a table-format by the program 20a, although the storage format and storage area of the identification number are not limited thereto; the identification number is stored in any storage area that is readable by the program 20a. Then, when the system of the present embodiment is to be used, the identification number is output from the keyboard instrument 30, and this identification number is received from the input/output unit 17 of the electronic instrument control terminal 10, or the user inputs the identification number given to the keyboard instrument 30 with use of an identification number input screen of the electronic instrument control terminal 10. Then, if the identification number that is output from the keyboard instrument 30 and input to the electronic instrument control terminal 10 or the identification number that is input using the identification number input screen of the electronic instrument control terminal 10 matches the identification number that is recorded in the flash memory 20 of the electronic instrument control terminal 10, the keyboard instrument 30 is authenticated (authentication is successful) (YES). If the authentication is successful, a connection is established between the electronic instrument control terminal 10 and the keyboard instrument 30, so that communication can be performed therebetween. Note that if the authentication is failed (NO), the connection between the electronic instrument control terminal 10 and the keyboard instrument is disconnected (step ST3), and this processing ends.

If the authentication is successful in step ST2 (YES), an operation screen, such as a screen that includes the keyboard image display region 70 shown in FIG. 3, is displayed (step ST4).

Next, it is determined whether or not a key in the keyboard image display region 70 is being pressed (the first input operation is performed on the display screen 12) (step ST5). If the key in the keyboard image display region 70 is not pressed (NO in step ST5), the processing returns to step ST5, and step ST5 is performed again.

If a key in the keyboard image display region 70 is pressed (YES in step ST5), it is determined whether or not the keyboard image display region 70 is being long-pressed (the second input operation is performed on the display screen 12) (step ST6). If it is determined that the long-press is not performed (NO in step ST6), it is determined that the key is being selected from the application of the electronic instrument control terminal 10 (step ST12), and key selection is ended. If it is determined that the long-press is performed (YES in step ST6), a message indicating "Please select a key by pressing a key on the instrument." is displayed as a popup in the display screen 12 (step ST7).

The user then presses a key 31 of the keyboard instrument 30 that is to be tuned (step ST8).

Information indicating the pressed key (a key press signal) is transmitted from the keyboard instrument 30 to the electronic instrument control terminal 10 (step ST9). Processing is then executed in the electronic instrument control terminal 10 based on the transmitted key information, that is to say, an indication of the selection of the key in the keyboard image 40 that corresponds to the pressed key 31 of the keyboard instrument 30 is displayed (step ST10). If a region other than the popup screen region of step ST7 is touched (YES in step ST11), key selection ends. However, if a region other than the popup screen region is not touched (NO), processing returns to step ST8.

After the key of the keyboard of the keyboard instrument 30 that is the tuning target is selected as described above, the pitch or volume of that key is adjusted. Specifically, the user adjusts the pitch or volume of the key 31 of the keyboard instrument 30 while pressing the key 31 and listening to a desired pitch or volume.

The following describes adjustment of the pitch or volume of a key 31 based on the operation screen in FIG. 3. When the "Each Key Setting" screen in the menu screen is touched, the "Each Key Setting" screen is displayed. Then, in the case of performing pitch adjustment, the Tune button 58 in the screen is touched, so that the pitch of the keys 31 can be increased or decreased by, for example, moving the slider 52 up or down. Here, in the "Tune" screen, an increase/decrease (parameter change amount 56) in the pitch (frequency) of an emitted sound is displayed with use of a bar graph.

Also, in the case of performing volume adjustment, when the Volume button 59 in the screen is touched, the volume of the keys 31 can be increased or decreased, that is to say the volume of the keys 31 can be increased or decreased by moving the slider 52 up or down, for example. Here, in the "Volume" screen, an increase/decrease (parameter change amount 56) in the volume of an emitted sound is displayed with use of a bar graph.

As described above, according to the present embodiment, when adjusting the parameters of the keys 31 of the authenticated keyboard instrument, the selection of the key 31 that is to be the adjustment target can be switched between selection performed on the display screen 12 of the electronic instrument control terminal 10 and selection by pressing a key of the keyboard instrument 30. In the case of selecting a key 31 from the keyboard instrument 30, the selection can be made by pressing the key. In this way, the selection can be made by pressing a key, and therefore the key can be selected accurately.

Further, after the key 31 is selected, tuning for each of the keys 31 of the keyboard instrument 30 can be performed using the electronic instrument control terminal 10. Accordingly, tuning (parameter adjustment) of the keyboard instrument 30 can be performed from a location separated from the keyboard instrument 30. Also, the parameter change amounts 56 of the adjusted parameters for the keys 31, which are relative to the initial parameter value 51, can be displayed as a bar graph in the display screen 12. For this reason, pitch and volume change amounts can be displayed in a visualized manner. Furthermore, fine adjustment can be performed by using the slider 52.

The keyboard instrument 30 has a split function in which the key region is divided (i.e., split) into left and right parts, and different tones are emitted on the left and right sides. In this split function, any position is set as the split point, the pitches higher than the split point are set as the right part (right key region), and the pitches lower than the split point are set as the left part (left key region).

In the present embodiment as well, the split point can be set by pressing a key of the keyboard instrument 30. When the split point is set, the key region of the keyboard can be divided into two parts, namely a low-pitch key region and a high-pitch key region, and the tone can be changed in the respective key regions. Accordingly, if the split function is turned on, music with the tone of the right part can be emitted when the right part is played, and music with the tone of the left part can be emitted when the left part is played.

The selection of the split point setting mode, that is to say the selection of whether the split point is to be set using the electronic instrument control terminal 10 or using the keyboard instrument 30, is performed by switching performed by the switching unit 27.

Accordingly, the setting of the split point can be performed similarly to the selection of the key 31 of which parameter is to be changed. In other words, by pressing a key of the authenticated keyboard instrument 30, the user can set the pressed key 31 as the split point. Also, the user can touch the plus button 42 or the minus button 43 in the "Each Key Setting" screen, or touch the keyboard image 40 in order to set the touched key 31 as the split point.

Note that by storing tones for various types of pianos in the electronic instrument control terminal 10, the user can select a piano tone that they desire to use. For example, by selecting an image for selecting a piano tone, the user can select a piano tone according to which the keyboard instrument 30 is to be tuned (parameters such as pitch, volume, and touch feel that are to be adjusted).

Note that the present invention is not limited to the present embodiment described above, and it goes without saying that various improvements and modifications can be made without departing from the gist of the present embodiment.

The keyboard instrument 30 is taken as an example in the description of the present embodiment. Specific examples of instruments that correspond to a keyboard instrument include a keyboard instrument that is an electronic instrument such as an electronic piano, an electronic organ, an electronic cembalo, or a synthesizer, as well as an electronic keyboard percussion instrument such as an electronic marimba or an electronic metallophone. Also, as another example, the electronic instrument may be an electronic instrument that does not have a keyboard as a constituent element, examples of which include a stringed instrument such as an electronic violin, a percussion instrument such as an electronic drum, a wind instrument such as an electronic saxophone, and a wind synthesizer. In this case, the operators of the stringed instrument may be strings, frets, pickups, or the like, the operators of the percussion instrument may be pads, and the operators of the wind instrument or wind synthesizer may be keys. If the percussion instrument is a drum set, the individual drums can be the operators.

Besides a liquid crystal display, the display screen 12 can be constituted by an organic EL panel. Note that besides adjusting the pitch and volume of each key 31, the tone can also be adjusted for each key 31.

With respect to data handling, settings and adjusted parameters can be stored in the flash memory 20, and the stored data can be transmitted to the keyboard instrument 30. For example, data indicating adjusted pitch or volume can be carried over, but it is also possible to perform setting for returning to the initial state in the case where a split point has been set and the tone has been changed for respective key regions.

Also, the CPU 19 can control switching between a normal operation state and a sleep state for standby with reduced power consumption. Accordingly, the CPU 19 has various conditions for starting up from the sleep state. In the case of starting up from the sleep state, the previous screen immediately before entering the sleep state is again displayed on the display screen 12, and the previous settings and adjusted parameters immediately before entering the sleep state are all carried over.

While the program 20a is starting up, the screen lock can be disabled.

The slider 52, the buttons such as the plus button 53 and the minus button 54, the keyboard image 40, the parameter background image 50, and the like described in the operation screen "Each Key Setting" may each be arranged at any position. Note that the name of the operation screen is of course not limited to "Each Key Setting".

Other examples are conceivable for the authentication performed on the electronic instrument control terminal 10 side. For example, the keyboard instrument may transmit an identification signal to the electronic instrument control terminal 10 via a transmission unit. The electronic instrument control terminal 10 receives the identification signal via a reception unit or the like, and, under control of the CPU of the electronic instrument control terminal 10, determines whether or not the received identification signal matches an identification signal that has been stored in advance in a storage unit of the electronic instrument control terminal 10. If the identification signal matches an identification signal that has been stored in advance in the storage unit, an authentication message indicating that the authentication is successful is displayed on the display screen 12 of the electronic instrument control terminal 10. Accordingly, a connection is established between the electronic instrument control terminal 10 and the keyboard instrument 30, and communication can be performed therebetween. If the identification signal does not match any of the identification signals that have been stored in advance in the storage unit, a connection is not established between the electronic instrument control terminal 10 and the keyboard instrument, and communication cannot be performed therebetween.

Also, an example is conceivable in which authentication is performed on the keyboard instrument side. For example, the electronic instrument control terminal 10 transmits an identification signal to the keyboard instrument via a transmission unit. The keyboard instrument receives the identification signal via a reception unit, and, under control of the CPU of the keyboard instrument, determines whether or not the received identification signal matches an identification signal that has been stored in advance in a storage unit of the keyboard instrument. If the identification signal matches an identification signal that has been stored in advance in the storage unit, an authentication message indicating that the authentication is successful is displayed on the display screen 12 of the electronic instrument control terminal 10. Accordingly, a connection is established between the electronic instrument control terminal 10 and the keyboard instrument 30, and communication can be performed therebetween. If the identification signal does not match any of the identification signals that have been stored in advance in the storage unit, a connection is not established between the electronic instrument control terminal 10 and the keyboard instrument 30, and communication cannot be performed therebetween.

The electrical configurations of the units, circuits, and the like of the present embodiment can be modified, added, deleted, exchanged, or the like as appropriate without departing from the gist of the present embodiment. For example, the electrical configurations of the units, the circuits, and the like provided in the electronic instrument control terminal 10 can be provided in the keyboard instrument 30, for example. Moreover, the electrical configurations provided in the keyboard instrument 30 can be provided in the electronic instrument control terminal 10.

The steps described with reference to FIG. 4 can be modified in terms of sequence, and can also be added, deleted, exchanged, or the like as appropriate without departing from the gist of the present embodiment. For example, the following example is also conceivable.

First, authentication for the keyboard instrument 30 is performed in the electronic instrument control terminal 10, in order to establish a connection between the keyboard instrument and the electronic instrument control terminal 10. Next, the power supply of the keyboard instrument 30 is switched on, and the program 20a of the electronic instrument control terminal 10 is started. The settings of the program 20a of the electronic instrument control terminal 10 are transmitted to the keyboard instrument 30, and the states of the program 20a and the keyboard instrument 30 are set the same, that is to say synchronized.

Then the user selects, in a selection screen, a piano tone according to which the keyboard instrument 30 is to be tuned (parameters such as pitch, volume, and touch feel that are to be adjusted). After a piano tone is selected, a key of the keyboard of the keyboard instrument 30 is selected as a target of tuning. After a tuning target key is selected, a parameter of that key is adjusted.

As described above, in the electronic instrument control terminal, when adjusting the parameters of the operators of the authenticated electronic instrument, the selection of the operator that is to be the adjustment target can be switched between selection performed using the terminal and selection performed using the authenticated electronic instrument, and when the selection of the operator that is to be the target of parameter adjustment is performed from the electronic instrument, the selection can be performed by operating the operator.

LIST OF REFERENCE NUMERALS

10 Electronic instrument control terminal (electronic instrument controller)
11 Connection establishing unit (connection establishing means)
13 Display control unit (display control means)
16 Key selection unit (operator selection means)
17 Input/output unit (reception means)
19 CPU
27 Switching unit (switching means)
28 Key selection display unit (key selection display means)
30 Electronic instrument (keyboard instrument)
31 Operator (key)
40 Operator group image (keyboard image)

The invention claimed is:

1. An electronic instrument controller configured to adjust parameter values of operators of an electronic instrument, the electronic instrument controller comprising:
a display screen having a touch panel type of input device;
a connection establishing means configured to authenticate the electronic instrument and establish a connection with the authenticated electronic instrument;
an operator selection means configured to, in accordance with a first input operation performed on the display screen, select an operator of the electronic instrument from an operator group image that is displayed on the display screen, the operator of the electronic instrument being configured to, when operated, cause the electronic instrument to emit a sound based on at least a parameter value of the operator, and the operator group image being an image corresponding to an operator group of the authenticated electronic instrument including the selected operator;
a switching means configured to, in accordance with a second input operation performed on the display screen, switch a selection reception unit from the operator group image displayed on the display screen to an actual operator of the authenticated electronic instrument, the selection reception unit being configured to receive selection of the actual operator of the authenticated electronic instrument;
a reception means configured to receive an operation signal that is output from the authenticated electronic instrument to indicate the actual operator of the authenticated electronic instrument that was selected; and
a display control means configured to, in accordance with reception of the operation signal, indicate an operator from the operator group image displayed on the display screen that corresponds to the actual operator of the authenticated electronic instrument that was selected.

2. The electronic instrument controller according to claim 1, wherein the second input operation is a long-press of a display region of the operator group image.

3. The electronic instrument controller according to claim 1, 
wherein the electronic instrument is a keyboard instrument, and
the operator of the electronic instrument is a key.

4. The electronic instrument controller according to claim 2,
wherein the electronic instrument is a keyboard instrument, and
the operator of the electronic instrument is a key.

5. An electronic instrument control system comprising:
the electronic instrument controller according to claim 1,
wherein the electronic instrument has a plurality of operators included in the operator group.

6. An electronic instrument control system comprising:
the electronic instrument controller according to claim 2,
wherein the electronic instrument has a plurality of operators included in the operator group.

7. An electronic instrument control system comprising:
the electronic instrument controller according to claim 3,
wherein the electronic instrument has a plurality of operators included in the operator group.

8. An electronic instrument control system comprising:
the electronic instrument controller according to claim 4,
wherein the electronic instrument that has a plurality of operators included in the operator group.

9. The electronic instrument controller according to claim 1, wherein the electronic instrument includes a plurality of operators, each of the plurality of operators being configured to, when operated, cause the electronic instrument to emit a sound, and the operator group image displayed on the display screen includes a plurality of displayed operators that respectively correspond to the plurality of operators of the electronic instrument.

10. The electronic instrument controller according to claim 1, wherein the first input operation performed on the display screen is a non long-pressing of a region of the display screen, and the second input operation performed on the display screen is a long-pressing of the region of the display screen.

11. A computer-implemented control method for an electronic instrument, comprising:

authenticating the electronic instrument and establishing a connection between an electronic instrument controller and the authenticated electronic instrument;

selecting, in accordance with a first input operation performed on a display screen, an operator of the electronic instrument from an operator group image that is displayed on the display screen, the operator being configured to, when operated, cause the electronic instrument to emit a sound based on at least a parameter value of the operator, and the operator group image being an image corresponding to an operator group of the authenticated electronic instrument including the selected operator;

switching, in accordance with a second input operation performed on the display screen, a selection reception unit from the operator group image displayed on the display screen to an actual operator of the authenticated electronic instrument, the selection reception unit being configured to receive selection of the actual operator of the authenticated electronic instrument;

receiving an operation signal that is output from the authenticated electronic instrument to indicate the actual operator of the authenticated electronic instrument that was selected; and displaying, in accordance with reception of the operation signal, an indication that indicates an operator from the operator group image displayed on the display screen that corresponds to the actual operator of the authenticated electronic instrument that was selected.

12. An electronic instrument controller configured to adjust parameter values of operators of an electronic instrument, the electronic instrument controller comprising:

a display screen having a touch panel type of input device;
a memory that stores instructions; and
a hardware processor configured to execute the instructions stored in the memory to cause the electronic instrument controller to:

authenticate the electronic instrument and establish a connection with the authenticated electronic instrument;

select, in accordance with a first input operation performed on the display screen, an operator of the electronic instrument from an operator group image that is displayed on the display screen, the operator of the electronic instrument being configured to, when operated, cause the electronic instrument to emit a sound based on at least a parameter value of the operator, and the operator group image being an image corresponding to an operator group of the authenticated electronic instrument including the selected operator;

switch, in accordance with a second input operation performed on the display screen, a selection receiver from the operator group image displayed on the display screen to an actual operator of the authenticated electronic instrument, the selection receiver being configured to receive selection of the actual operator of the authenticated electronic instrument;

receive an operation signal that is output from the authenticated electronic instrument to indicate the actual operator of the authenticated electronic instrument that was selected; and indicate, in accordance with reception of the operation signal, an operator from the operator group image displayed on the display screen that corresponds to the actual operator of the authenticated electronic instrument that was selected.

* * * * *